United States Patent [19]

Wolff et al.

[11] Patent Number: 4,583,319
[45] Date of Patent: Apr. 22, 1986

[54] METHOD OF AND APPARATUS FOR SPRAYING FOLIAR COMPOSITION

[75] Inventors: Robert L. Wolff, Carbondale, Ill.; Dennis G. Watson, East Lansing, Mich.; John G. Clapp, Jr., Greensboro, N.C.

[73] Assignee: Arcadian Corporation, Parsippany, N.J.

[21] Appl. No.: 749,430

[22] Filed: Jun. 27, 1985

FIG. 6

METHOD OF AND APPARATUS FOR SPRAYING FOLIAR COMPOSITION

This invention relates to an improved method and apparatus for applying foliar spray of aqueous-solution fertilizer, and/or herbicide, and/or pesticide.

BACKGROUND TO THE INVENTION

In the development of the present invention, it has been discovered that many previous mechanisms for applying foliar spray material do not effectively contribute to the obtaining of good coatings and to obtaining well-distributed coatings on foliage, with regard to each of the tops and bottoms of leaves. In other words, teachings from the prior art, so to speak, have proven to be ineffective for precise application. In the present invention, for example, it has been discovered that what works for a flattened stream of spray is not equally true for a conical spray pattern. Likewise, it has been found that a non-solid stream does not have the required spray characteristics, and that very specific controls are required to obtain a successful result by method and apparatus thereof.

Prior to the present invention, application of liquid composition by foliar spraying has been inconsistent, producing poor results. Inconsistent results were obtained by Garcia and Hanway, 1966—"Foliar Fertilization of Soybeans During the Seed-Filling Period"; Agronomy Journal 68(4): 635–657. Himel stated that the efficiency rate for pesticide is usually less than one percent, 1982—Himel, C. M., "Analytical Systems for Pesticide Spray Transport and Impingement"; American Society of Agricultural Engineers Paper No. 82-1001.

Prior also to the present invention, there has been some experimentation involving various apparatuses and blowers for application of spray in foliar spraying, but as noted above, with limited success. For example, air blast sprayers have been used on row crops in some experimental work, by Kahn, A. S., T. G. Carpenter and D. L. Reichard, 1981—"Variables Affecting Spray Deposit Efficiency of a Row Crop Airblast Sprayer", American Society of Agricultural Engineers Paper No. 68-149. These row crop row blast sprayers spray several rows at one time from one air and fluid outlet point. A type of single row air blast applicator was developed by farmer Bruce Viker and has been tested with herbicides in terms of percent control—Roehl, L. J. 1982, "Row Crop Spray Evaluation", American Society of Agricultural Engineers Paper No. 82-1007. Other sprayers have used an air stream to atomize the spray material—(1) Wilkes, L. H. 1961—"Effects of Nozzle Types and Spray Application Methods on Cotton Insect Control", Transactions of the ASAE 4: 166–169; and (2) A. Zucker and N. Zamir, 1984—"Air Carriers Sprayers for Cotton", Journal of Agricultural Engineering Research 9: 188–193. In contrast to spray method and apparatuses thereof, the present invention has taken a novel approach in its method and apparatus.

Prior to describing the present invention, it is noted that for entirely different and unrelated fields and for different purposes having no relationship nor bearing on specific beneficial results achieved in this invention in foliar spray application, there have been apparatuses for spraying and applying paints, varnishes and the like, such an U.S. Pat. No. 1,897,173 by R. Long et al. granted Feb. 14, 1933, and U.S. Pat. 2,051,210 by E. Gustafsson granted Aug. 18, 1936, and U.S. Pat. No. 3,252,657 by D. D. Winegar granted May 24, 1966, and U.S. Pat. No. 4,236,674 by George Dixon granted Dec. 2, 1980. A mere air-nozzle that is non-spraying is covered by U.S. Pat. 4,050,632 to Harold G. Wyse granted Sept. 27, 1977.

OBJECTS OF THE INVENTION

A primary object of the present invention is to obtain a method and apparatus for applying a liquid composition to foliage of vegetation by spraying, and in so doing to achieve a major and significant increase in amount of coating of spray particles on foliage of vegetation as contrasted to poor low levels of deposition heretofore.

Another major object is to obtain by the novel method and apparatus, a major and significant increase in spray-coating of undersides of leaves of vegetation sprayed, in contrast to heretofore most deposited spray being on the top surface of the leaves.

Another major object is to obtain improved efficiency in spray application of liquid composition to foliage of vegetation, to achieve a major and significant reduction in required volume of liquid composition required to obtain not only equivalent results but improved deposition in spray-coating of foliage of vegetation, as contrasted to large volumes thereof heretofore required which when heretofore applied achieved poor levels of deposition.

Another object is to obtain improved distribution, to obtain a more homogeneous application of spray particles to foliage of vegetation by the present spray method and apparatus.

Another object is to obtain a method and apparatus therefore, that avoids damaging of vegetation as the apparatus moves through the vegetation being sprayed.

Other objects become apparent from preceding and following disclosure.

One of more objects of the invention are obtained by the invention as described herein, and illustrated in the accompanying Figures which are intended to improve understanding, but to not unduly limit the invention to the illustrative example, the invention including variations and modification and mechanical-equivalents for substitution within ordinary skill.

BROAD DESCRIPTION OF THE INVENTION

Broadly the invention may be defined in terms of each of the method and apparatus, respectively, described hereinafter.

The method includes step of first spraying a liquid composition from a flat, solid-stream spray nozzle at a pressure of about 10 to about 75 pounds per square inch producing at the nozzle-outlet a spray stream having a cross-sectional area (of the orifice(s)) of from about 0.0000948 to about 0.0323000 square inches, in a direction laterally and/or rearwardly toward vegetation foliage to be coated with the spray, while concurrently as a second step directing gas(es) in substantially the same or a common direction as the spray stream but from opposite non-circumscribing positions on opposite sides of the spray nozzle or spray stream therefrom, such that the gas(es) intersect and impinge on the spray stream of the sprayed liquid composition at a distance (range) of about five to fifteen inches, while the support structure therefore and the vehicle carrying the support structure advance forwardly at a speed of from about one to about ten mile per hour. Guiding baffles on each of opposite sides of the directed-gas, extend from about one to eight inches, and as measured from an axis of the directed-gas longitudinally, each baffle is angled divergingly at angle(s) ranging from zero to about 20 degrees, and that axis of directed-gas relative to a second axis extending from the directed-gas outlet and parallel to a longitudinal axis of the spray stream, is at a converging angle toward the spray stream at from about zero degrees to about 50 degrees.

Preferred results are obtained by narrower limits: with liquid spray pressure of from about 35 pounds per square inch to about 60 pounds per square inch; and the steam orifice cross-section (and stream at the orifice) being between about 0.0001152 and 0.0008640 square inches; and the directing-angle for the gas(es) being from about 10 to 35 degrees; and the baffle lengths being between about 2 and 5 inches and the baffle angles each being about 5 to 15 degrees; and the point of gas(es) impingement onto the spray stream being at from about 6 to about 10 inches outwardly from the orifice of the spray stream; and the speed of forward advancement being between about 3 and 6 miles per hour. The locations and directions of the opposing oppositely-spaced gas vents and gases thereof cause the gases to intersect and impinge upon the outer peripheries of the gas stream to form a partial, incomplete, non-circumscribing shroud of the spray stream.

As above-noted, the longitudinal axis of direction of the directed gas is not necessarily toward nor even parallel with the spray stream's longitudinal axis of direction thereof, but in fact preferred results above-noted and as set-forth in the objects, are obtained when the direction of the directed gas's axis (from side of the opposite two or more sources/locations and vents thereof) is at an angle converging on the spray-stream's longitudinal axis within an angle of from about ten to about thirty-five degrees, above-noted. This is contrary to what might have been expected on the theory that total spray concentration would be better placed as would be obtained if gas-directing streams totally surrounded, or circumscribed, and impelled from all circumscribing locations against the spray stream. Alternatively, one might expect better distribution and coverage from a conical nozzle. Neither of these approaches work however, the invention requiring a flat-spray solid-stream type nozzle, and requiring that the impinging directed-gases being solely from substantially two opposite sides, together with all the other limitations already set-forth in preceding paragraphs.

Moreover, it has proven to be true that preferred results are obtained when the gas-shrouded (as above described for this invention) spray stream is impinged by directed-gas—i.e. the shroud, of which the shroud at the outlet-port of the directed-gas vent is of a thickness of from about 0.20 inch to about 0.30 inch, thereby maximizing and optimizing results set-forth in preceding objects.

Also the length of the baffles of the gas-directing vents, i.e. the second dimension versus distance between oppositely positioned baffles, ranges from about one inches to about twelve inches, preferably from about two to about nine inches.

Also, while moving the spray nozzle along normally below the level of the top of the vegetation and its foliage, the preferred and optimum and maximized results in deposition of coating, and of homogeneous distribution, together with equalizing coverage on the top and bottom of leaves, are obtained when the spray nozzle and associated gas-directing structures, are all directed substantially commonly upwardly preferably within a range of about 25 to about 35 degrees relative to a horizontal, during the spraying.

Likewise, while moving the spray nozzle(s) along normally below the level of the top of the vegetation foliage, the prefer and optimum and maximized results in deposition, homogeneous distribution and improved coverage of both bottom and top of foliage, together with other such above-noted objects, are obtained when the spray nozzle and structure(s) directing the gas(es) from the plurality above-noted, are all directed substantially laterally relative to a direction of forward or advancing movement of a moving vehicle on which support structure and the spray nozzle(s) and associated gas-directed apparatus(es) and supported and/or mounted. Maximum preferred results are achieved when the later angle is within about 75 and about 105 degrees relative to an axis extending along a direction of movement of the support vehicle.

Results are further enhanced together with avoidance of damage to plants and foliage thereof, by mounting the nozzles spaced-apart along an open boom or boom-like structure such that the nozzle(s) and their associated gas-directing apparatus(es) may be optimally positioned as above-noted, at a level preferably below the top of the vegetation with spray streams meeting or overlapping at the point of contact with the foliage.

In further prevention of damage to the plants and foliage thereof, and/or in altering position(s) of foliage to be sprayed, fender structure or the like is mounted on the apparatus(es) of the spray nozzle and/or associated gas-directing structure and/or on the support structure thereof, positioned ahead of the spray nozzle(s) and gas-directing structure(s) such that and adapted to shielding is provided to divert the plant foliage from its normal growing position, aside upwardly or laterally, or downwardly.

Preferred optimal results in achieving above-noted objects are achieved by spraying the liquid spray stream under substantial pressure as noted above. Likewise, the rate of flow of the directed-gas assists in accelerating and/or maintaining spray-suspension and preferably ranges between about 40 cubic feet to about 75 cubic feed per minute for optimal results of above-noted objects.

While preferably the directing-gas is air, it may be any other convenient gas such as nitrogen, carbon dioxide, or some insecticidal or herbicidal or growth-stimulating gas or suspension, or mixture(s) thereof. Likewise, it could be a gas entrained in or a part of the liquid composition being sprayed from the nozzle(s); such gas(es) may be any one or more of the above-noted gas(es).

The overall spraying and gas-directing mechanism(s) are typically mounted on a boom, as noted-above, and in any event on a support structure with or without a boom, and such support structure is mounted on and conveyed by a vehicle that is motorized for the advancing forwardly substantially horizontally during spraying. As used herein, motorized vehicle is intended to include a trailor device taken together with a truck, tractor or the like that would pull the device or have the device mounted thereon.

The motorized vehicle optimally and preferably during spraying moves fowardly (advances) at a reasonable rate as above-noted.

The liquid composition sprayed by and as a part of the method and apparatus(es) of this invention, may be any conventional pesticide such as insecticide, herbicide and/or aqueously-soluble fertilizer and/or growth stimulant ingredient(s) and/or composition(s), and/or mixtures thereof, in a suitable liquid medium such as water.

A major purpose of the invention was to improve the performance of liquid application of agricultural materials, specifically, to improve the control of spray particle placement and increased deposition in a given target area over the level obtained with conventional hydraulic spraying nozzles. The problem associated with conventional nozzle arrangement and spraying methods is the inability to accurately direct spray particles to a desired target area when the target consists of plant foliage or is obstructed by plant foliage or crop stubble. Examples of these problems situations are the application of foliar fertilizers to soybeans or herbicides to soil through wheat stubble. Conventional nozzle arrangements have been found to provide less than desirable spray placement control to the target area in these situations. This lack of spray droplet control with conventional applications results in low spray coverage on the target areas, excessive particle drift and ineffectively applied spray material, together with excessive waste of spray material.

The method and apparatus therefor of the present invention, typically referred to as the air stream assisted spraying method, improve(s) the performance of conventional nozzle spraying by using air streams to accelerate droplets, providing better directional control and confining the spray particles to the target area. These characteristics of the invention increase spray coverage in the target area of the plant and reduce spray particle drift, together with other benefits set-forth in the preceding objects.

The invention may optimally be practiced with ground spraying equipment.

An air supply for the air vents can be provided from a fan mounted on the spraying equipment and ducted to the air vents through tubing. The air-vent nozzle units can be mounted in various configurations within a spray shroud structure or open boom, depending on the spray target area. Spraying would then take place with conventional hydraulic atomization nozzles with air vents accelerating, directing, and confining the spray particles. The placement of an air vent adjacent to or around a conventional nozzle enhances spray particle deposition through its acceleration of droplets within the discharge pattern of the air vent, thereby confining the spray particles to the target area and reducing drift.

The invention may be better understood by making reference to the following Figures.

DETAILED DESCRIPTION

It is to be noted that the term "preferred" as utilized herein connotes that the particular characterized embodiment or limitation is considered to be critical for achieving the benefical results associated herewith, based on experimentation by the present inventors.

The air stream assisted spraying system consists of two major components. These components are the air supply fan and tubing and the air-vent nozzle units. These components were installed on a Hahn Hi-Boy sprayer, model H-312. The air-vent nozzle units were used within a spray shroud structure and on an open boom.

The air source for the air stream was provided by a hydraulically driven centrifugal fan (Buffalo Forge model BL-445) mounted on the Hahn Hi-Boy sprayer with tubing to route the air to the air vents. The hydraulic fan drive system allowed for convenient testing of various fan speeds. Air flow to the air vents at the highest fan speed of 1500 revolutions per minute was 69 cubic feet per minute at 3175 feet per minute velocity for the hollow cone unit. The airflow to each of the air vents of the flat fan was 44 cubic feet per minute at 2031 feet per minute air speed.

To route the air flow to the air vent nozzle units a manifold chamber was constructed and mounted on the fan outlet. This manifold reduced the air outlet size from one opening of 2.83 square feet to eight openings of 1.5 inches in diameter.

The routing of air from the manifold to the air vent consisted of semi-rigid tubing, plastic pipe, and flexible tubing. Semi-rigid polyvinyl chloride reinforced plastic tubing was used to duct the air flow from the manifold to the custom spray boom drops. This plastic tubing was chosen because of its smooth inner surface and its availability in two inch inside diameter. Each piece of tubing was 9.5 feet in length. Two inch inside diameter schedule polyvinyl chloride plastic pipe in five foot lengths were secured to the spray boom drops in a vertical position. At the upper end of each piece of plastic pipe a two inch coupling was glued in place. The semi-rigid tubing was then secured to the coupling with sheet metal screws.

For air supply to the flat fan units, a four inch length of 1.5 inch inside diameter plastic pipe was attached to the lower ends of the two inch plastic pipe to serve as a union. Silicone rubber caulking was used to seal the joints of the plastic pipe union and the larger plastic pipe. A more flexible tubing was required to make the 120 degree band from the custom boom drop to the air vents, so flexible automotive heater duct tubing was chosen. The heater tubing was of wire reinforced cloth construction with an inside diameter of 1.88 inches. One end of the hose was connected to the plastic pipe and the other end to the air vent. For the hollow cone type units, 2.25 inch inside diameter heater duct tubing was used to connect the lower end of the plastic pipe and the air vent. The air supply tubes were routed to each flat fan unit, whereas each hollow cone unit required only one air supply.

The flat fan type air vent unit consisted of an adjustable mounting base constructed from sheet steel and hinges. The mounting base provided a mounting point for conventional flat fan nozzle in the center and hinged mounting points for a vacuum formed plastic air vent on each side of the nozzle. The plastic air vents were designed to emit a flat fan type air pattern. The air vents were formed using an Emco model 810 vacuum forming machine and a positive type die made from wood. The plastic used for the air vents was 0.13 inch polystyrene. The hinging mechanism was adjusted so that the air stream from both sides would intersect the fluid pattern six inches from the nozzle tip. The air vents were secured to the mounting base with foam rubber weatherstripping and hose clamps. The angle of the air vent pattern was eighty degrees and the opening size was approximately two square inches. The eighty degree air vent pattern corresponded to the eighty degree spray pattern of the flat fan nozzle.

The hollow cone type air vents were constructed using 28 gauge galvanized sheet steel to form inner and outer cones. Galvanized pipe fittings were brazed to the cones to provide the fluid source for the hydraulic nozzles mounted within the inner cone. Design was such that air did not enter the inner cone but only flowed through the gap between the two cones to form an air shield or shroud around the spray pattern. Silicone rubber caulking was used to seal the inner cone from the outer cone. The hollow cone unit was designed for use with a hollow cone nozzle spraying a seventy degree pattern, thus the air pattern was a seventy degree cone. The width of the air outlet around the inner cone was 0.25 inches.

A Hahn Hi-Boy, model H-312, high clearance sprayer with a six foot clearance was used as the prime mover for the field testing. Custom spray boom drops were attached to the mounting frame. The custom spray boom drops had an adjustable mounting point for the air bent nozzle units, which allowed variable positioning in the horizontal and verticle planes. An air vent nozzle unit was mounted on each side of the row and the nozzles were directed perpendicular to the direction of travel and upward at a thirty degree angle. This two nozzle per row arrangement was used in an attempt to maximize coverage on the undersides of leaves in the upper half of the soybean plant. Curved sheet metal fenders were mounted in front of the air vent nozzle units to funnel the soybean foliage between the units and minimize the tendency for the leaves to be torn on the air vent nozzle units.

The spray shroud structure was designed to cover the top and both sides of one crop row. The shroud was initially constructed to test recirculation feasibility of conventional nozzle spraying, and subsequently used with the air assist spraying method. Construction of the shroud structure was accomplished using a 22 gauge sheet aluminum and ¾ inch galvanized conduit. The conduit served as the frame of the shroud structure on which the aluminum sheeting was mounted with rivets. Each shroud structure consisted of five sections. These sections were a top section, a left and right bottom section and a left and right removable section. The middle sections were installed when spraying corn and removed for the shorter soybeans. The shroud structure was suspended from a rectangularly-shaped mounted frame secured to the hydraulic lift points of the sprayer and directed-gas/fan apparatuses. The air-vent nozzle units were attached to the shroud structure in the desired position for each test of the sprayer performance. Accordingly, the presence of the air vents for directing the air to impinge upon the spray stream provide acceleration and direction and control for placement of the deposition of the liquid composition being sprayed.

To date, the air stream assist spraying method of this invention has been tested on corn and soybean plants, for example. The coverage values obtained on plants with the air assist treatments were compared coverage values obtained with conventional (two and three nozzle per row) treatments evaluated on both corn and soybeans in 1981. The method and apparatus in this spraying test resulted in better and improved spray coverage than conventional nozzles alone. In addition to increasing coverage on the top portion of the plant, there was considerably better overall plant coverage, including the underside of the foliage leaves.

The inventive method and apparatus were tested within the spray shroud structure, during 1982 and compared to conventional nozzle arrangements which were evaluated using the same spray shroud structure. A two nozzle per row, ten gallon per acre treatment by the inventive method and apparatus, on corn increased spray coverage from 0.26 to 0.53 percent overall, and from 0.09 to 0.94 percent on the bottom surface of the leaves, compared to the best conventional treatment. The inventive method and apparatus improved spray coverage over the conventional treatments by approximately 50 percent overall. The coefficient of variation values, which are an indication of the uniformity of application, were improved by the inventive method and apparatus with a resulting reduction of over 25 percent in the coefficient of variation value.

The inventive method and apparatus also demonstrated improvement over conventional spraying methods and apparatuses. One air assist treatment resulted in 3.11 and 0.82 percent coverage for the top and bottom surfaces respectively of the leaves in the upper portion of the plant. The percent coverage value for the entire plant was 1.37 percent. The inventive method and apparatus improved spray overall coverage by 334 percent while concurrently also improving the uniformity.

In another test of the inventive method and apparatus, higher spray coverage on the bottom surface of the leaves resulted, with coverage values of 0.05 percent for the top and 2.26 percent for the bottom surfaces of the leaves in the upper portion of the plant. Table I lists the percent coverage values for the conventional and air assist treatments. The air streams, which intersected the fluid nozzle pattern and accelerated the droplets, allowed better controlled deposition of spray material to the target area of the plants, than had previously been found with conventional methods. The air vent nozzle unit could be arranged to deposit spray on the desired target area of the plant. Coverage on the underside of leaves which was minimal and difficult to obtain with conventional methods was improved with the inventive method and apparatus.

TABLE I

Mean Percent Coverage Values Resulting from Conventional and Inventive Method & Apparatus-treatments Conducted within the Spray Shroud Structure on Corn and Soybeans

| CROP | TREATMENT | ENTIRE PLANT | UPPER HALF OF PLANT: TOP LEAF SURFACE | UPPER HALF OF PLANT: BOTTOM LEAF SURFACE | UPPER HALF OF PLANT: BOTH SURFACES |
|---|---|---|---|---|---|
| Corn | Conventional | 0.26 | 0.63 | 0.09 | 0.30 |
| Corn | Inv. Method | 0.53 | 0.79 | 0.94 | 0.81 |
| Soybenas | Conventional | 0.41 | 1.58 | 0.44 | 0.28 |
| Soybeans | Inv. Meth./1st | 1.37 | 3.11 | 0.82 | 1.69 |
| Soybeans | Inv. Meth./2nd | 1.04 | 0.05 | 2.26 | 0.95 |

Tests were performed during 1983 to evaluate the inventive method and apparatus without the shroud enclosure structure. Additionally a hollow cone type air vent nozzle unit was tested. Tests of the hollow cone type air unit revealed that the addition of the air stream did not significantly improve deposition and provide other advantages. Accordingly, the improved and preferred method is best characterized by the gas/air-directing locations and streams of gas/air there from begin on opposite sides of flat fan spray nozzle, resulting in a spray-pattern having an oblong appearance, but with the directing gas/air coming from a sufficient number of different locations or positions as to cause the directing gas/air to substantially sandwich and shield the spray stream, and this method and apparatus are characteristically termed to be the flat-fan method and apparatus, because such tend to flatten-out the cross-sectional appearance of the spray stream as above-noted into a flattened oblong appearance.

The method and appearance may be better understood by now making reference to the preceding Figures. Common or similar indicia are utilized for parts that are substantially the same on different figures and embodiments.

First, however, it should be noted that the above-stated cross-sectional areas were calculated; for example, the areas of 0.0000949 square inches to 0.0323000 square inches, correspond to a flat-type solid-stream commercially-available nozzle having orifice diameter(s) (distance across) from 0.011 inch to 0.203 inch.

For all limitations and ranges of angles, dimensions and locations described and/or shown in the illustrations, they have been found by field experimentation to be critically essential in order to achieve the objects of this invention as stated above. The table involving and contrasting conventional non-inventive structure in the preceding Table I, are typical of such observations.

FIGS. 1 through 5 all illustrate different views and features of the same preferred embodiment, and accordingly indicia to the extent shown in one or more of the Figures are the same. FIG. 6 illustrates a unit that does not embody the invention, but is included to illustrate criticality of the inventive limitations, the FIG. 6 structures or apparatus having likewise been field tested.

FIG. 1 shows an actually built and successfully operated motorized vehicle 6 mounting each of: a spray liquid-tank 9; compressed-air-source-fan 10*a;* a liquid-pressurizing pump 10*b* for pressurizing the liquid being sprayed; boom(s) and boom-support structure(s) 7 (collectively); the several separate spray nozzles (not visible) 12 and their associated baffles 15; fenders 35; and a showing of the nozzle and baffle combinations being directed slightly upwardly, laterally and rearwardly.

FIG. 2 is a diagrammatic face-on view of the flat-solid stream-spray-type nozzle 12 and slotted-outlet ports 12*a* and 12*b* thereof, and spray-liquid inlet conduit 11, and flat-solid spray-pattern 13, and air-inlet conduits 14*a* and 14*b,* and directed-gas vents 20*a* and 20*b,* and baffles 15*a,* 15*b,* 15*aa,* and 15*bb* thereof, and the sandwiching air-shrouds 16*a* and 16*b,* the non-shrouded (non-circumscribed) spray-mists 17*a* and 17*b,* and the baffles's length-dimension 18, and the baffles's diverging-angle 19. While the support structures are not shown in this FIG. 2, the illustrated elements are factually mounted in the positions and orientations shown, such as the nozzle and air-directing apparatuses being angled slightly upwarded as shown.

FIG. 3 illustrates diagrammatically a top-view of FIG. 2. There are shown the gas-directing vents 20*a* and 20*b,* spray nozzle 12 (shown in phantom), support pivots 29*a* and 29*b,* imaginary first axis 21, imaginary second axis 22, imaginary third axis 26, imaginary linear-line direction 24, angle 25, angle 23, and baffle 15*a.* Basically the same view is FIG. 4 showing imaginary areas 21 and 23 and 26, and the intersecting and target-distance 27, and baffle-distance dimension 28 that the baffles each extend along their respective imaginary axes 26, and the pivots 29*a* and 29*b* revolvable in either and each of opposite directions 29*a',* air unit-mounting clamp 30. It is to be understood that FIG. 4 illustrations are diagrammatically presented.

FIG. 5 diagrammatically illustrates an in-part view of boom(s) 7*x,* 7*y,* and 7*z* mounting nozzles (not visible) 12 and their respective associated gas-directing apparatuses 12*x,* 12*y,* and 12*z,* and support structure(s) 7*a* thereof, illustrating the preferred arrangements of the spray streams 16*x,* 16*y,* and 16*z* meeting or over-lapping each other as they strike the target(s) typically diagrammatically represented as target 34. Spaces 33 exist before directed-air shroud impinges the spray-stream(s).

FIG. 6 diagrammatically illustrates a conical spray nozzle 31 and fully conical and circumscribing gas-directing baffles 15*c* and 15*d,* resulting in a hollow annular spray having an annular air shroud 16*a* fully circumsribing the spray steam. In the illustration, space 33 exists (as shown) at the illustrated location at which the air-shroud has not yet impinged upon the inner conical spray stream 31*a.*

FIG. 2 angle 19 is the earlier mentioned diverging angle of the baffles. Width dimension 20*x* represents the air-shroud thickness at the distal ends of opposing baffles. Length dimension 18 represents the length of the baffles at their distal ends, and likewise, of the air shroud at that point (location). FIG. 3 angle 25 discloses the converging angles of the baffles (such as 15*a*) relative to imaginary axis 24 that is parallel to the imaginary axis 26 that is the longitudinal axis of the direction in which the directed-air is moving. Angle 23 is defined between imaginary axis 26 and the imaginary axis 22 that is parallel to imaginary axis 21 that is longitudinal axis of the direction of movement of the spray stream from nozzle 12.

Figure 1:
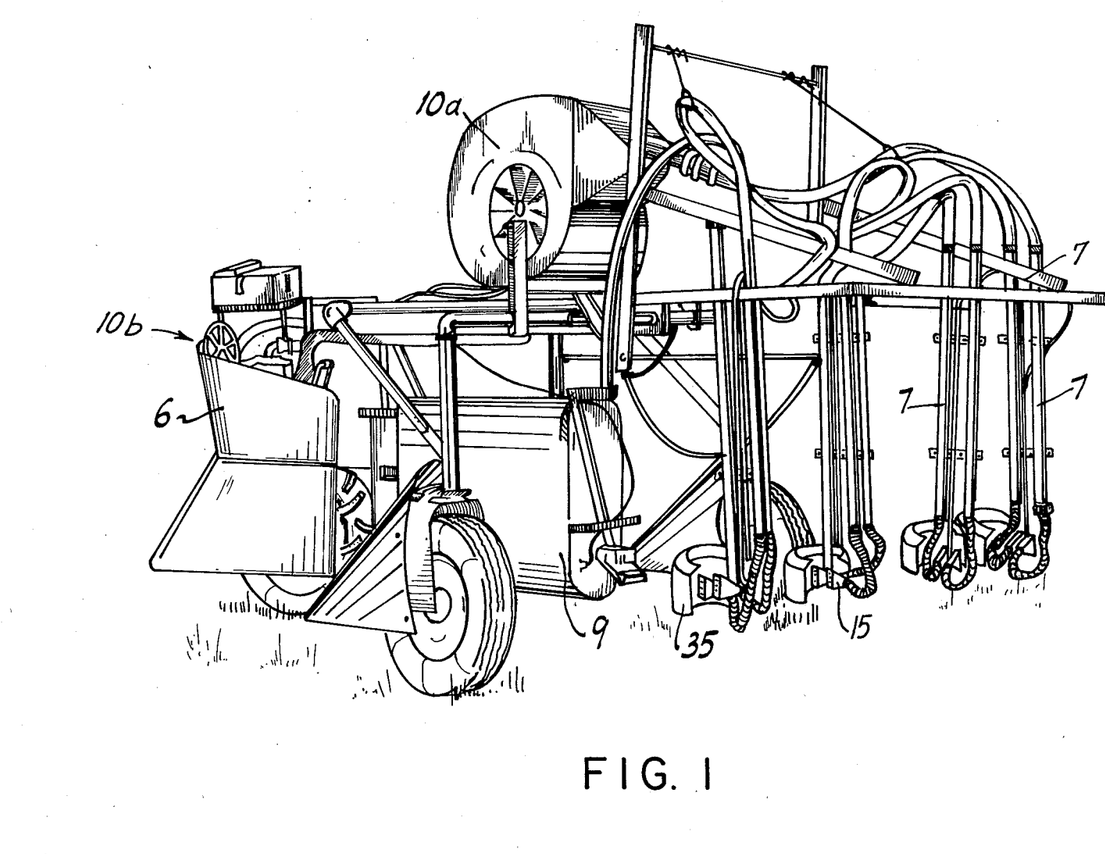
FIG. 1 illustrates a perspective view of a tractor-vehicle mounting a liquid-containing tank, fan conduits, boom(s), nozzle, and associated gas-directing structure.
Figure 2:
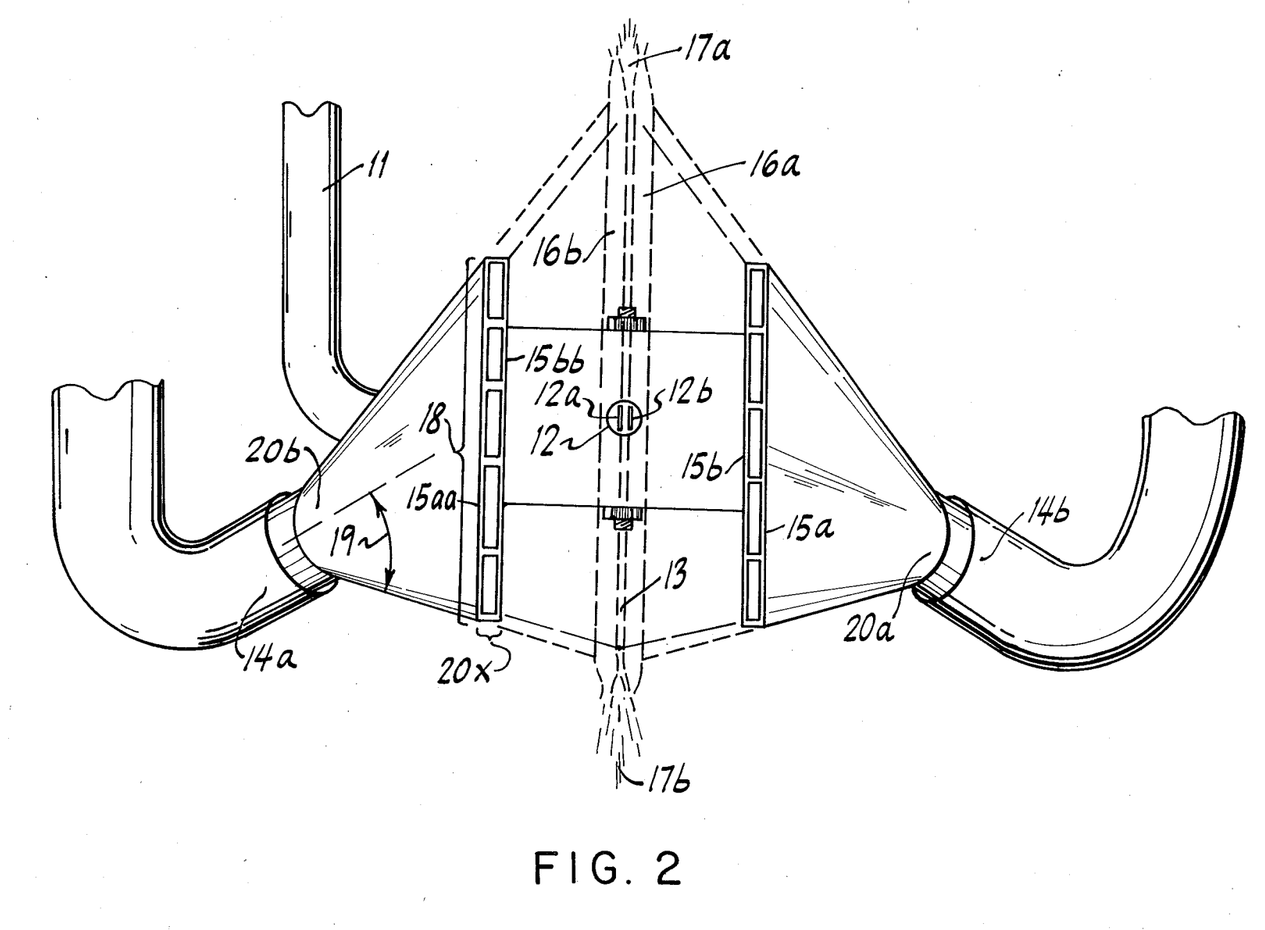
FIG. 2 diagrammatically illustrates the flat-spray nozzle and associated gas-directing structure, spray inlet conduit and air-inlet conduit, and spray and air-shroud patterns are formed.
Figure 3:
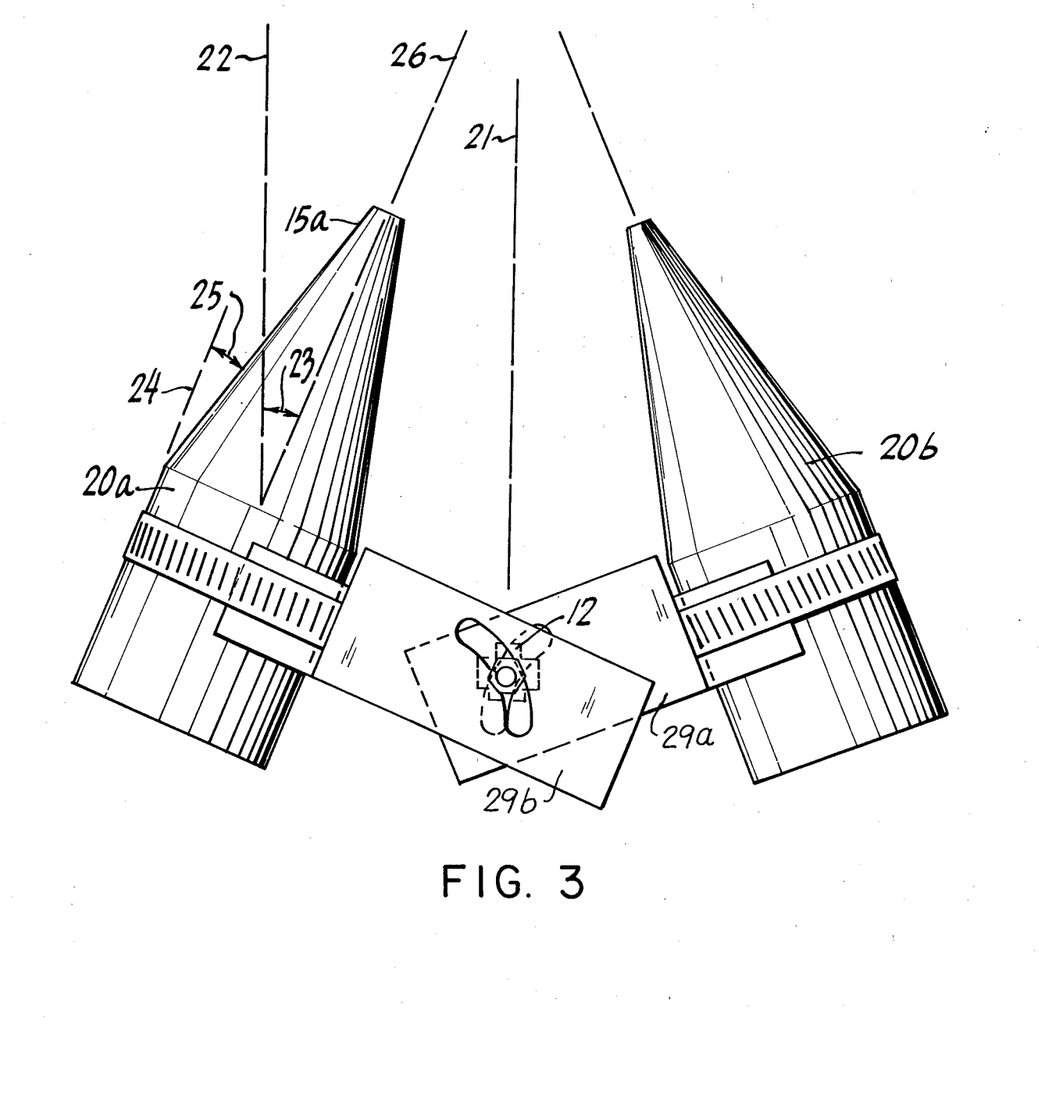
FIG. 3 diagrammatically illustrates a top view of FIG. 2.
Figure 4:
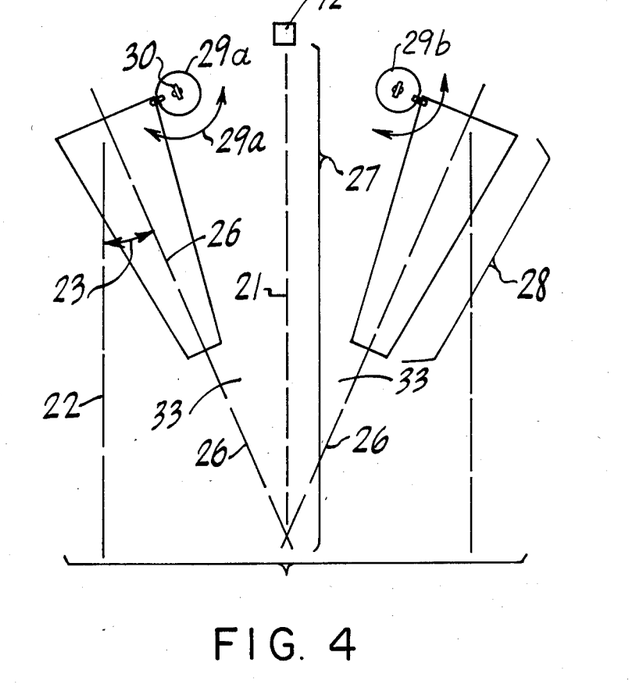
FIG. 4 symbolically also illustrates the same view as FIG. 3.
Figure 5:
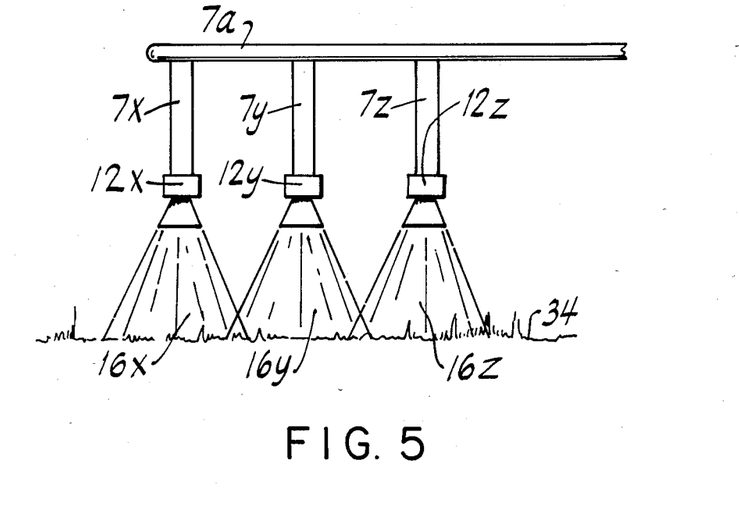
FIG. 5 illustrates diagrammatically an in-part view of the boom(s) structures and spray-nozzles and gas-directing apparatuses mounted thereon, showing data regarding overlap of spray patterns.
Figure 6:
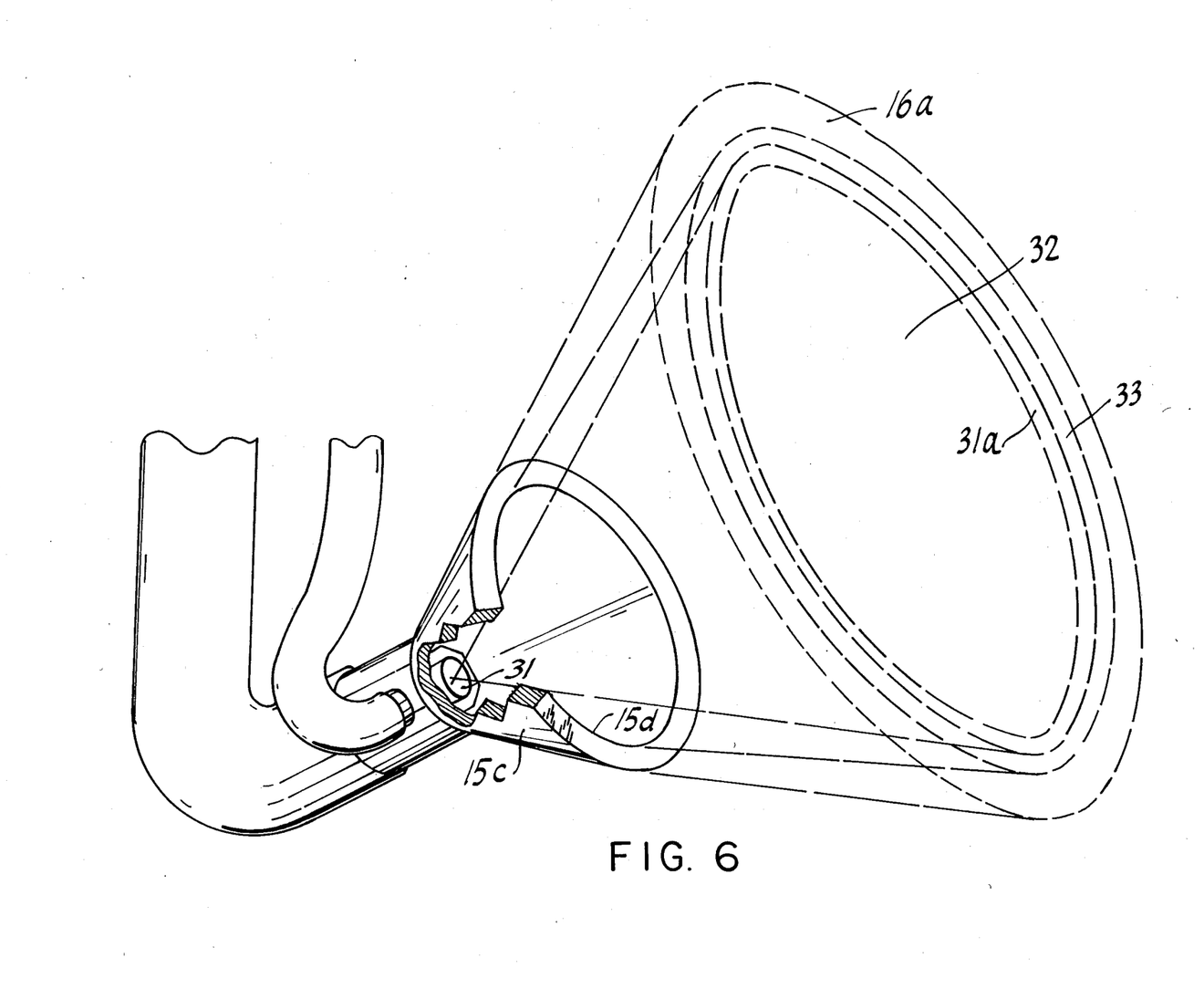
FIG. 6 illustrates a conical spray nozzle having a central air space, i.e. non-solid stream, with totally circumscribing air-shroud, diagrammatically.

FIG. 4 angle 23 (described-above) is the angle at which the directed air is adjusted to converge downwardly toward the imaginary longitudinal axis 21, as measured between imaginary axis 26 and imaginary axis 22. Distance dimension 27 represents the distance to points (locations) of the target and approximately of the impingement on the spray stream by the oppositely inwardly-directed sandwiching air-shrouds 16a and 16b of FIG. 2.

There is no relevant prior art with regard to spray-particles distribution homogeneously on both top and bottom surfaces of foliage nor having to do with foliar spraying.

Non-analagous patents dealing with spray paint nozzles and the spray patterns therefrom, include: Long et al. U.S. Pat. No. 1,897,173, and Gustafsson U.S. Pat. No. 2,051,210, and Winegar U.S. Pat. No. 3,252,657, and Dixon U.S. Pat. No. 4,236,674. None of the patents relate to nor teach anything in regard to foliar spraying nor to the many critical limitations of the present invention.

We claim:

1. A method of spraying liquid composition onto foliage of vegetation, comprising in combination: (a) spraying in at least one of lateral and rearward directions a liquid composition as a solid flat spray stream at a liquid pressure ranging from about 10 to about 75 pounds per square inch from an orifice of a spray nozzle along a longitudinal first axis toward and onto foliage of vegetation; while advancing about the foliage and substantially horizontally to ground level at a forwardly rate of speed of about 1 to 10 miles per hour; (b) concurrently directing a gas as gas streams from gas vents in directions substantially the same as said spraying of said spray stream such that said directed gas intersects and impinges upon said liquid composition as the liquid composition is sprayed-away-from the spray nozzle whereby amount and uniform distribution of spray of the composition onto top and bottom surfaces of foliage of vegetation is enhanced by greater deposits more uniformly distributed, said directing being from at least two spaced-apart locations on substantially opposite sides of said spray stream positioned to form spaced-apart separate non-circumscribing barriers on opposite two sides of said spray stream such that particles of said spray stream are prevented from diverging beyond said two opposite barriers, each said directing of said gas stream being at a directing angle ranging from about zero to about 50 degrees relative to a second axis spaced-away from and parallel to said longitudinal first axis of said spray stream; said spray stream at said spray nozzle having an orifice cross-sectional area ranging from about 0.0000948 square inches to about 0.00323000 square inches; and said directing of said gas streams including positioning gas vents from which said gas streams flow, with each gas vent having at least oppositely-spaced-apart baffles each extending a distance of from about 1 to about 12 inches, each said baffle ranging relative to said second axis, from about zero to about 20 degrees in a direction of the opposing baffle of the same gas vent, and angles of said directing being such that each said gas-stream impinges upon said spray stream at a distance of from about five to about fifteen inches distant from said orifice.

2. A method of claim 1, in which said liquid pressure ranges from about 35 pounds per square inch to about 60 pounds per square inch, and in which said stream at said orifice has a cross-sectional area ranging from about 0.0001152 square inches to about 0.0008640 square inches.

3. A method of claim 2, in which said directing angle ranges from about 10 degrees to about 35 degrees, and in which each of said baffles extends a distance of from about 2 inches to about 5 inches, and in which said baffles each are maintained at an angle within a range from about 5 degrees to about 15 degrees in said direction of the opposing baffle of the same vent, and in which said angles of said directing being such that each said gas-stream impinges upon said spray stream at a distance of from about 6 to about 10 inches distant from said orifice, and in which said forwardly rate of speed ranges from about 3 to about 6 miles per hour.

4. A method of claim 2, in which said liquid composition comprises a major amount of pesticide relative to other ingredients thereof, during said spraying.

5. A method of claim 2, in which said liquid composition comprises a major amount of fertilizer in aqueous solution, during said spraying.

6. A method of claim 1, in which said directing angles ranges from about 10 degrees to about 35 degrees, said baffles extend a distance of from about 2 inches to about 5 inches, said baffles each range from about 5 degrees to about 15 degrees in said direction of the opposing baffle of the same vent, and in which angles of said directing are such that each said gas-stream impinges upon said spray stream at a distance of from about 6 to about 10 inches distant from said orifice, and in which said forwardly rate of speed ranges from about 3 to about 6 miles per hour.

7. A method of claim 1, in which said directing angle ranges from about 10 degrees to about 35 degrees.

8. A method of claim 1, in which said baffles extend a distance of from about 2 inches to about 5 inches.

9. A method of claim 1, in which said baffles each range from about 5 degrees to about 15 degrees in said direction of the opposing baffle of the same vent.

10. A method of claim 1, in which said angles of said directing are such that each said gas-stream impinges upon said spray stream at a distance of from about 6 to about 10 inches distant from said orifice.

11. A method of claim 1, in which said forwardly rate of speed ranges from about 3 to about 6 miles per hour.

12. A method of claim 1, in which said liquid pressure ranges from about 35 pounds per square inch to about 60 pounds per square inch.

13. A method of claim 1, in which said orifice cross-sectional area ranges from about 0.0001152 square inches to about 0.0008640 square inches.

14. A method of claim 1, in which said liquid composition comprises a major amount of pesticide relative to other ingredients thereof, during said spraying.

15. A method of claim 1, in which said liquid composition comprises a major amount of fertilizer in aqueous solution, during said spraying.

16. A method of claim 1, in which said liquid composition comprises a major amount of herbicide relative to other ingredients thereof, during said spraying.

17. A method of claim 1, including positioning spray structure to cause said spraying to be directed at an upward angle.

18. A method of claim 1, including said spraying being at a rate of flow of between 40 cubic feet to about 75 cubic feet per minute.

19. An apparatus for applying foliar spray to foliage of vegetation, comprising in combination: foliar spray means for spraying a liquid composition onto foliage of vegetation, in at least one of lateral and rearward directions as a solid flat spray stream at a pressure of from about 10 pounds per square inch to about 75 pounds per square inch; support means for supporting said foliar spray means in positions in juxtaposition to vegetation foliage such that the spray stream will strike foliage within a range distance of about 5 to about 15 inches from the spray means; and vehicular means for advancing said support means and said foliar spray means to and past said vegetation foliage at a forwardly rate of from about 1 to about 10 miles per hour; said foliar spray means comprising liquid spraying means for spraying a liquid composition along a first axis from a spray nozzle toward and onto foliage of vegetation, and gas-directing means spaced laterally from the spraying means, for directing gases from at least two spaced-apart locations on opposite sides of said liquid spraying means in a direction substantially the same as spray from said liquid spraying means concurrently at an angle of from about zero degrees up to about 50 degrees relative to a second axis extending from the gas-directing means, said second axis being parallel to said first axis, such that said gas is directable to intersect and impinge upon said spray at said range distance during said spraying from said liquid spraying means, said liquid spraying means including a spraying orifice having a cross-sectional area of from about 0.0000948 square inches to about 0.032300 square inches, and said orifice including diverging baffles diverging relative to said second axis, from about zero to about 20 degrees.

20. An apparatus of claim 19, in which said foliar spray means liquid pressure ranges from about 35 to about 60 pounds per square inch, and in which said orifice ranges from about 0.0001152 to about 0.0008640 square inches.

21. An apparatus of claim 20, in which said vehicular means advances between about 3 to about 6 miles per hour, in which said gas-directing means sprays at said angle ranging from about 10 to about 35 degrees relative to said second axis, in which said baffles extend from about 2 to about 5 inches, in which said baffles each range from about 5 degrees to about 15 degrees, and in which range distance is from about 6 to about 10 inches.

22. An apparatus of claim 19, in which said gas-directing means includes vent-structure directing movement of said gas from a plurality of different directions and locations, and in which relative to said second axis, said plurality are each positioned to direct gas away from said second axis.

23. An apparatus of claim 19, in which said support means includes an open boom, and said foliar spray means is mounted thereon.

24. An apparatus of claim 23, including a plurality of said foliar spray means mounted on said open boom, spaced-apart from one another predetermined distances such that at said distance diverging spray from one of the foliar spray means substantially meets or overlaps diverging spray from adjacent one or more other ones of the foliar spray means.

25. An apparatus of claim 19, including fender structure mounted on said support means, said fender structure being positioned ahead of said foliar spray means relative to movement in said forward direction, adapted to shield said foliar spray means by diverting vegetation foliage aside during movement of the vehicular means in said forward direction.

26. An apparatus of claim 19, in which said vehicular means comprises a motorized carrier.

27. An apparatus of claim 19, including pressure means for spraying liquid composition by said foliar spray means.

28. An apparatus of claim 19, in which said diverging baffles at distal ends thereof are spaced-apart a distance between about 0.20 and about 0.30 inches, adapted to form a gas-shroud of said distance in thickness.

29. An apparatus of claim 19, in which said baffles at distal ends thereof have a width each of between about one inch and twelve inches.

30. An apparatus of claim 19, in which said baffles at distal ends thereof each have a width of between about two inches and about nine inches.

* * * * *

UNITED STATES PATENT AND TRADEMARK OFFICE
CERTIFICATE OF CORRECTION

PATENT NO. : 4,583,319
DATED : April 22, 1986
INVENTOR(S) : Robert L. Wolff et al.

It is certified that error appears in the above-identified patent and that said Letters Patent is hereby corrected as shown below:

On the Title Page, Item /73/ should read:

--- /73/ Assignee: 50% to Arcadian Corporation, Parisippany, N.J. and 50% to Southern Illinois University Foundation, Carbondale, Illinois. ---

Signed and Sealed this

Twenty-ninth Day of July 1986

[SEAL]

Attest:

DONALD J. QUIGG

Attesting Officer

Commissioner of Patents and Trademarks